United States Patent [19]

Hayes et al.

[11] Patent Number: 4,626,681
[45] Date of Patent: Dec. 2, 1986

[54] DIFFERENTIAL PRESSURE CONTROL APPARATUS

[75] Inventors: Thomas E. Hayes; J. Scott Jamieson; Scott L. Spence, all of Goshen, Ind.

[73] Assignee: Johnson Service Company

[21] Appl. No.: 650,454

[22] Filed: Sep. 14, 1984

[51] Int. Cl.[4] .............................................. G01D 5/34
[52] U.S. Cl. .................................. 250/231 P; 73/705
[58] Field of Search ............... 250/231 P; 200/83 SA, 200/83 S; 73/705, 722, 728, 715

[56] References Cited

U.S. PATENT DOCUMENTS

| 3,308,303 | 3/1967 | Weichselbaum et al. | 250/231 P |
| 3,898,454 | 8/1975 | Friday et al. | 250/231 P |
| 4,220,836 | 9/1980 | Hersey | 200/83 S |
| 4,289,963 | 9/1981 | Everett | 250/231 P |
| 4,464,963 | 8/1984 | McIntire et al. | 73/705 |

Primary Examiner—David C. Nelms
Assistant Examiner—William L. Oen
Attorney, Agent, or Firm—Larry L. Shupe; Joseph J. Jochman, Jr.; John P. Ryan

[57] ABSTRACT

A differential pressure control apparatus includes a switch responsive to a pneumatic differential pressure for signaling the actuation of a blower motor. A signal generating section is provided and controls the speed of a blower for regulating the differential pressure. This section includes first means for sensing a projected light beam and second means for modulating the light beam. The first means and the second means are positionably displaceable one to the other in response to the magnitude of the differential pressure. Two preferred embodiments are disclosed.

9 Claims, 9 Drawing Figures

DIFFERENTIAL PRESSURE CONTROL APPARATUS

This invention relates to a control device of the differential pressure type and more particularly, to a pneumatic control device adapted to sense differential pressure and generate an electrical output signal for maintaining the differential pressure within a range of pressures. The apparatus is particularly useful for furnace draft control.

Devices which are constructed to sense and signal a differential pressure are widely useful in process control systems for generating an output signal which is representative of the instantaneous differential pressure and which may be either merely indicative thereof or may be used for controlling the differential pressure within predetermined limits. One application for such an apparatus is to be found in gas-fired furnaces. In such furnaces, events such as gusts of air blowing across the furnace flue can cause dramatic and undesirable changes in furnace draft. It is therefore desirable to control differential pressure to result in a draft which is adequate to provide a proper condition of combustion. This overfire or firebox draft must therefore be controllably maintained within a relatively narrow range of pressures. Typically, control in known systems is by regulation of the position of air flow controlling dampers.

A two-state or binary control apparatus which may be used for such purposes is shown in U.S. Pat. No. 4,289,963 and utilizes an actuating pin having an integral, laterally-extending vane, the latter for interrupting a beam of light being transmitted from a source to a sensor. The pin and its vane are movable when the differential pressure across a diaphragm exceeds a preset value determined by the force exerted upon the pin by a counterbalancing spring. So long as the differential pressure is below the preset value, a first electrical condition results. When the differential pressure exceeds this value, resulting in an interruption of a light beam, a second electrical condition results and no analog control is possible.

Yet another apparatus which may be used for such control is shown in U.S. Pat. No. 4,322,979 and uses a glass prism having a right isosceles cross section through which a controllable amount of light from a source is transmitted through the first side to a sensor coupled to the second side. A diaphragm movable with changes in differential pressure thereacross is proximate the prism and incorporates a light-permeable surface. The amount of light so transmitted is a function of the proximity of the light-permeable surface to the hypotenuse side of the prism. An analog output signal is thereby provided to represent changes in the differential pressure.

U.S. Pat. No. 3,935,522 shows a controller capable of providing analog-type, stepless speed control of a fan motor. Motor speed is a function of the setting of a variable resistor, presumably accomplished manually. Yet other examples of devices using reflected light for pressure detection or measurement are shown in U.S. Pat. Nos. 3,789,667; 4,210,029 and 4,322,978.

While these devices have heretofore been generally satisfactory, they tend to be characterized by certain disadvantages. In particular, they have failed to appreciate the manner in which a differential pressure controller may be constructed to have low mass and therefore low hysteresis and may incorporate an integral blower motor actuating switch. They have also failed to appreciate how such a controller may be adapted to generate an electrical analog output signal representative of very small pressure differentials and useful for closely-regulated motor speed control while yet avoiding physical contact between the differential pressure sensing portion and the electrical signal generating circuit.

SUMMARY OF THE INVENTION

In general, a differential pressure control apparatus includes a switch responsive to a pneumatic differential pressure for signaling the actuation of a blower motor. A signal generating section is provided and controls the speed of a blower for regulating the differential pressure. This section includes first means for sensing a projected light beam and second means for modulating the light beam. The first means and the second means are positionably displaceable one to the other in response to the magnitude of the differential pressure.

It is an object of the present invention to provide a differential pressure control apparatus for performing both blower actuation signaling and blower speed control functions.

Yet another object of the present invention is to provide a control apparatus which includes means for sensing a projected light beam and means for modulating the light beam, thereby controlling a differential pressure.

Still another object of the present invention is to provide a control apparatus wherein the sensing means and the modulating means are positionably displaceable one with respect to the other and coact for controlling blower speed. How these and other objects of the invention may be accomplished will become apparent from the detailed description thereof taken in conjunction with the drawing.

DETAILED DESCRIPTION OF THE EMBODIMENTS

Figure 1:
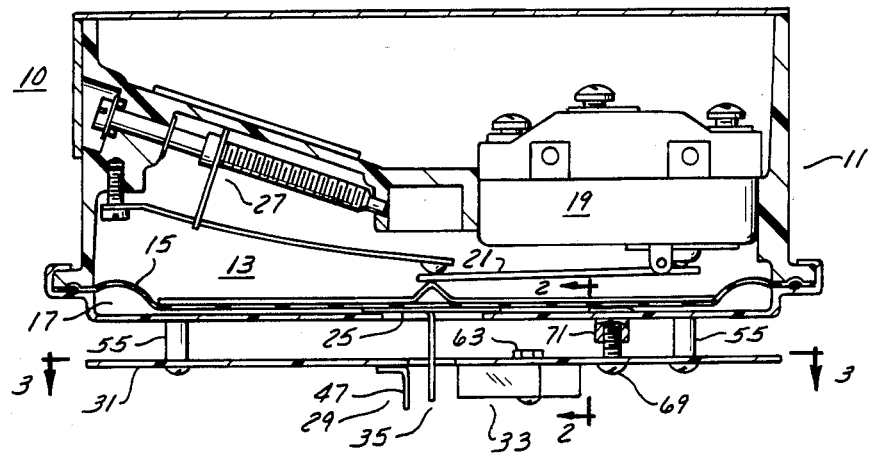
FIG. 1 is a side elevation view of a first embodiment of the differential pressure control apparatus with portions shown in cross section and other portions shown in full representation.
Figure 2:
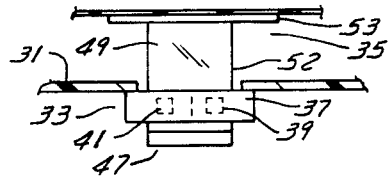
FIG. 2 is an end elevation view of the signal generating section of the first embodiment taken along the plane 2—2 of FIG. 1 and with portions omitted for clarity.
Figure 3:
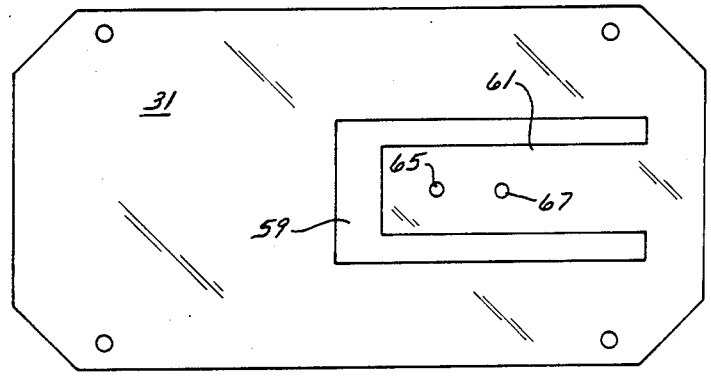
FIG. 3 is a top plan view of the printed circuit board of the first embodiment taken along the plane 3—3 of FIG. 1.

Referring first to FIGS. 1, 2 and 3, a first preferred embodiment of the control apparatus 10 is shown in conjunction with a housing 11 sealable to prevent leakage of pneumatic fluid between the second chamber 13 portion of the housing interior and its exterior. A movable, highly-resilient diaphragm 15 is disposed in the housing 11 in a manner to define a first chamber 17 for receiving air at ambient pressure and a second chamber 13 for receiving air at a draft pressure. The size and location of the diaphragm 15 is selected to maintain the first chamber 17 and the second chamber 13 in fluid flow isolation one from the other. A two-position, single-pole double-throw switch 19 is mounted within the second chamber 13 and includes an actuating arm 21 movable with the diaphragm 15 for switch manipulation to signal the actuation of a blower. A port 23 is provided within the housing 11 to facilitate a pneumatic connection between the apparatus 10 and the spatial region, an exemplary furnace fire box, the draft pressure in which is to be controlled. This port is arranged to be in fluid flow communication with the second chamber 13. A second port 25 is provided to be in fluid flow communication between the surrounding ambient air and the first chamber 17 and is operative to maintain the first chamber 17 at ambient pressure. The apparatus 10 may optionally include an adjustable screw mechanism 27 for selecting the differential pressure at which the switch operates. Further particulars regarding the construction of the diaphragm 15 and related elements are shown and described in U.S. Pat. No. 4,467,998 of Scott L. Spence entitled "High Gain Pneumatic Switch" and assigned to the same assignee as this application. The aforementioned patent is incorporated herein by reference.

Figure 4:
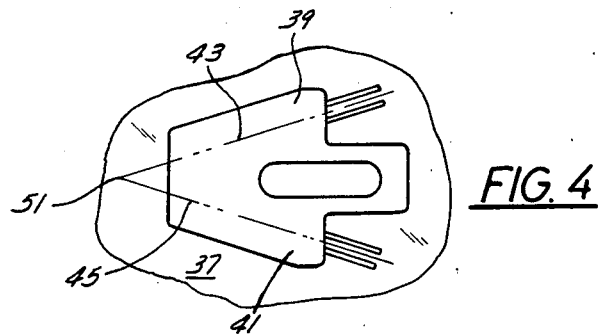
FIG. 4 is a plan view of a module having constructed therewithin a light source and a light sensor.

The apparatus 10 also includes a signal generating section 29 having certain components supported upon a printed circuit board 31 and constructed and arranged for controlling the speed and therefore the air flow output of the blower. The section 29 includes first means 33 for sensing a projected light beam and second means 35 for modulating the light beam, the first means 33 and the second means 35 being positionably displaceable one to the other in response to the magnitude of the differential pressure across the diaphragm 15, i.e., the difference between the ambient pressure in the first chamber 17 and the draft pressure in the second chamber 13. Referring to FIGS. 2 and 4, the first means 33 includes a module 37 having a source 39 for generating and projecting a light beam and a light beam sensor 41 for generating an electrical output signal in response to the magnitude of luminous flux received at the sensor 41. In one type of module 37, the source 39 and the sensor 41 are disposed therewithin in a manner such that the source projection axis 43 and the sensor reception axis 45 define an included angle of about 34 degrees. An example of one type of module 37 useful in the first preferred embodiment of the apparatus 10 is the type OPB 703 reflective object sensor as available from Optron, Inc. of Carrollton, Tex. The first means 33 also includes a reflecting member 47 rigidly attached to the under side of the board 31 and having a front surface 49 which is generally planar and sufficiently reflective to cause the sensor 41 to be operative. A white surface 49 has been found suitable for the purpose. The member 47 is preferably oriented so that its planar surface 49 is normal to the plane defined by the projection and reception axes 43, 45 and is positioned at the spatial intersection point 51 of those axes 43, 45. The second means 35 is preferably embodied as a generally planar, opaque blade 52 attached to the diaphragm 15 by a base member 53 and movable therewith for modulating the magnitude of the luminous flux projected by the source 39, reflected from the surface 49 and received at the sensor 41. In the first preferred embodiment and with the diaphragm 15 in the position of repose as shown in FIG. 1, the blade 52 is selected to have a height to fully impede the passage of light from the source 39 to the member 47. That surface of the blade adjacent the source 39 and sensor 41 is preferably made non-reflective, either by blade material selection or by coating thereof.

Figure 7:
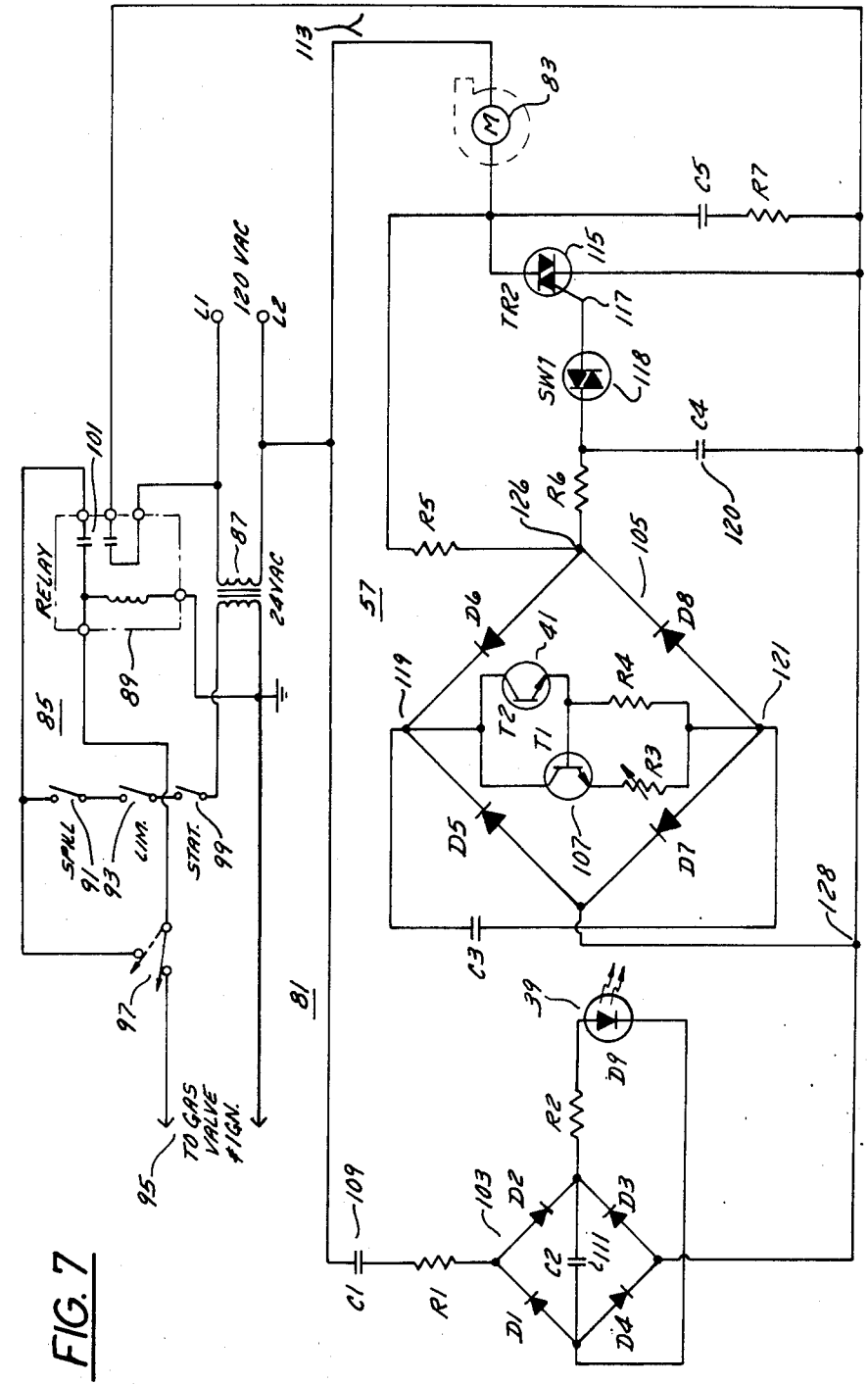
FIG. 7 is an electrical schematic diagram of a controller with which the apparatus of the first embodiment may be used to regulate the speed of a blower motor.

Referring to FIGS. 1, 3 and 7, the printed circuit board 31 may be mounted to the underside of the housing 11 by appropriate insulating standoff studs 55 and is convenient for supporting those electrical components of FIG. 7 comprising the line voltage section 57 as described hereinafter. The board 31 is conventionally formed of an electrically insulating material and includes a U-shaped slot 59 defining a mounting tongue 61 for attachment of the module 37 by a fastener 63 inserted through a first opening 65. A second opening 67 is sized to receive an adjusting screw 69 with slight clearance for engagement with an internally threaded, rigidly mounted bushing 71 attached to the housing 11. Rotation of the screw 69 will cause slight flexure of the tongue 61 for positioning the module 37 with respect to the lower edge of the blade 52. A coiled compression spring (not shown) is disposed concentric with the screw 69 and intermediate the tongue 61 and the bushing 71, thereby urging the tongue 61 downwardly as viewed in FIG. 1. This permits adjustment of the plane of the tongue 61 to a position above or below that of the board 31. One may thereby adjust the vertical position of the projected light beam and therefore the point at which the blade 52 will commence light beam modulation.

It will be apparent to those of ordinary skill in the pneumatic and control arts that one possible construction of a signal generating section 29 is to mount the module 37 and the member 47 upon the diaphragm 15 for movement therewith while supporting the blade 52 upon the printed circuit board 31 or housing 11 to be stationary with respect thereto. This arrangement may be highly workable in applications where the mass inertia of the diaphragm 15 and generating section 29 is relatively unimportant, i.e., where high differential pressures are to be sensed by a thick diaphragm which itself has relatively high mass inertia. However, in furnace draft control applications, the differential pressure to be sensed may be very small, perhaps on the order of 0.15 inches of water, and the mass inertia of the diaphragm 15 and of any structural components mounted upon the diaphragm 15 will be significant and important. Therefore, the embodiment portrayed in FIG. 1 is preferred for applications involving low differential pressures.

Figure 5:
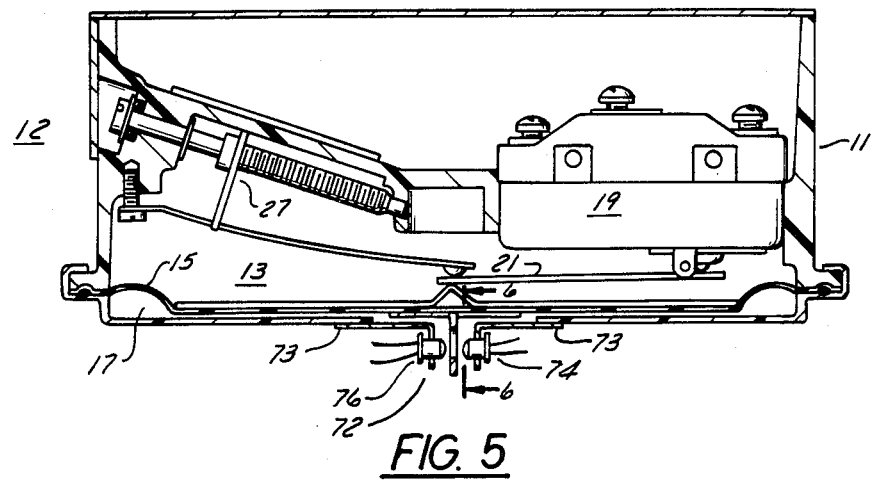
FIG. 5 is a side elevation of a second embodiment of the control apparatus of the invention with portions shown in cross section and other portions shown in full representation.
Figure 6:
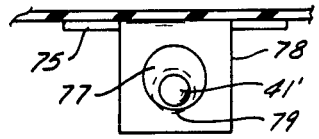
FIG. 6 is an end elevation view of a portion of the signal generating section of the second embodiment of the control apparatus taken along the plane 6—6 of FIG. 5.

Referring next to FIGS. 5 and 6, a second preferred embodiment of the invention differs only slightly from that of the first and includes as the first means 72 a source 74 for generating and projecting a light beam and a separately-mounted light beam sensor 76 for generating an output signal in response to the luminous flux of the received light. The source 74 and the sensor 76 are mounted to the lower surface of the housing 11 by separate support brackets 73 and in a generally opposed, spaced apart relationship.

A generally planar opaque blade 78 is attached to the diaphragm 15 by a base member 75 in an attitude generally normal to the axis of projected light and includes an aperture 77 formed therein at a location such that the light beam being projected by the source 74 may be received unimpeded by the sensor 76 when the diaphragm 15 is in its repose position as shown, i.e., with no differential pressure thereacross. Diaphragm movement in response to a differential pressure will cause the aperture edge 79 to intercept and modulate the intensity of the light beam, thereby resulting in a sensor output signal which is representative of differential pressure and which may be used for controlling blower motor speed.

A control circuit 81 useful with the apparatus 10 of the first embodiment to provide speed control of a blower motor 83 is shown in FIG. 7 and includes a low-voltage section 85 and a line-voltage section 57, the former including components normally supplied and mounted upon the furnace by the furnace manufacturer. These components include a low voltage supply transformer 87, a two pole electromagnetic relay 89 and a normally closed heat sensitive switch 91, termed a "spill" switch, which is thermally opened by a flame spilling from the fire box interior as may result from a flue blockage or other similar impairment to adequate draft. A normally closed, thermally opened bonnet switch 93 limits the maximum furnace bonnet temperature. The low-voltage section 85 is configured to further include a pair of terminals 95 useful for operating the gas valve and ignition system of a gas-fired furnace. Referring additionally to FIGS. 1 and 5, the contacts 97 of the switch 19 are connected as shown and system actuation may be by a thermostat, the contacts 99 of which are connected to energize the relay 89 upon thermostat contact closure. At the time of closure of the contacts 99, the relay 89 will be energized and its contacts 101 will close, resulting in the application of voltage to the line-voltage section 57. When the low voltage section 85 is configured as shown, each operating sequence of the controller will verify the proper function of the relay 89 and of the switch 19. That is, a control circuit 81 having relay or switch contacts 101 or 97 respectively which, for example, have fused to a closed position or are somehow abnormally held in an open position will be inoperative on the next operating sequence or will then cease to be operative, depending upon the type of failure which has occurred.

The line voltage section 57 includes a full-wave rectifying bridge 103 for powering the light source 39, an exemplary LED, and a diode bridge 105 having incorporated therewithin the light sensor 41, embodied as a phototransistor, and a second transistor 107 which may advantageously be employed for improved circuit gain. The capacitors 109 and 111 cooperate to define a capacitive bridge to reduce the voltage applied to the source 39 to about 1.2 volts while yet avoiding the high power loss associated with resistive bridges.

The blower motor 83 is effectively coupled between the two legs 113 of the line-voltage section 57 by a power triac 115 having a gate 117 for controlling the RMS voltage applied to the motor 83. When the circuit 81 of FIG. 7 is used with the first embodiment disclosed herein, the silicon bilateral switch 118 is connected to the triac gate 117 for controlling the phase conducting angle of the triac 115. In the exemplary embodiment, switch 118 is selected to conduct for gating only when the potential across capacitor 120 is at least about 8 volts. When the sensor 41 is prevented by the blade 52 from receiving light, it will have relatively low current flowing therethrough. The diode bridge 105, connected between nodes 126 and 128 and including the transistors 41, 107 will then appear to be analogously equivalent to a resistor of relatively high value coupled between nodes 126, 128. Capacitor 120 is thereby permitted to charge at the maximum rate, reaching a potential of about 8 volts very early in the phase angle of the sine wave voltage being applied to motor 83. The result is that switch 118 and therefore triac 115 conduct at a time to permit substantially the entire sine wave voltage to be applied to the motor 83 which will run at maximum speed. As the intensity of the luminous flux received at the sensor 41 increases, the bridge 105 analogously functions as a resistor of diminishing value coupled between nodes 126, 128. This increases the time required to charge capacitor 120 to about 8 volts and therefore increases the phase angle at which switch 118 and triac 115 conduct. The result is a decrease in the RMS voltage applied to the motor 83 and a consequent reduction in motor speed.

Figure 8:
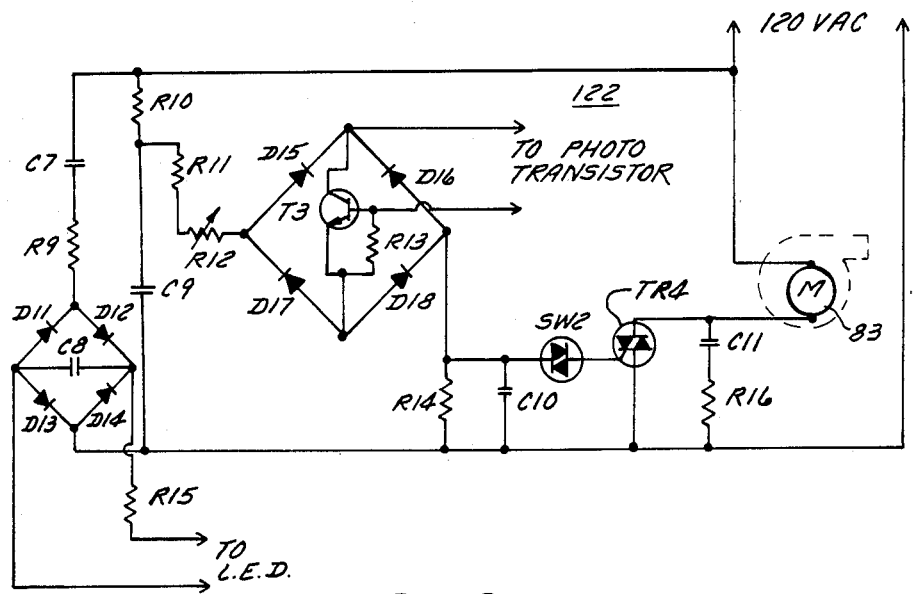
FIG. 8 is an electrical schematic diagram of the high voltage section of a controller with which the apparatus of the second embodiment may be used to regulate the speed of a blower motor.

FIG. 8 illustrates the line voltage section 122 of a controller useful with the apparatus 12 of the second embodiment. The function of the section 122 is closely similar to that of the section 57 of FIG. 7 while the low voltage section (not shown) is identical to the section 85 of FIG. 7. It is to be appreciated that the operation of the section 122 is opposite that of section 57. That is, the speed of the blower motor 83 when used with the control circuit of FIG. 8 will be at its maximum when the diaphragm 15 is in the position of repose as shown in FIG. 5 and the sensor 76 is fully illuminated. Motor speed will diminish as the aperture 77 increasingly modulates the projected light beam.

In certain gas-fired furnaces, it is preferable to maintain the furnace draft within a range of differential pressures with the limits of the range being defined by a first-range pressure, typically approximately 0.14 inches water, and a typical second range pressure of approximately 0.16 inches water. It is further desirable to cause the switch contacts 97 to transfer from its first position as shown in solid line in FIG. 7 to its second position as shown in dotted line as the draft pressure reaches a minimum, predetermined actuating differential pressure. In a typical application, this actuating differential pressure may be approximately 0.10 inches water. It is to be appreciated that a draft pressure is conventionally expressed as a value which is algebraically unsigned and which is negative with respect to the prevailing ambient pressure, nominally 14.7 p.s.i.a. or 0 p.s.i.g. It is to be further appreciated that a differential pressure is conventionally rendered as an absolute number, the same being the arithmetic difference between the ambient pressure and the draft pressure. Those conventions are used herein.

Referring to FIGS. 1-4, 7 and in operation with the exemplary furnace in a quiescent, non-fired condition, a closure of the thermostat contact 99 will energize the relay 89, causing line voltage to be applied to the motor 83. With respect to the apparatus 10 of the first embodiment and at the instant of energization, the pressure in the firebox will be equivalent to that of the surrounding ambient and there will be no differential pressure across the diaphragm 15. In consequence, the blade 52 will fully interdict the projected light beam and the motor 83 will be caused to operate at its maximum speed. The draft resulting from the operation of the blower motor 83 will cause the pressure in the firebox to diminish slightly, thereby creating a differential pressure across the diaphragm 15 to move the blade 52 to a position which permits a portion of the available light to be reflected by the member 47 and received at the sensor 41. The conduction angle of the power triac 115 will thereby be decreased and the motor speed will diminish. A point will be reached where the system stabilizes about some intermediate motor speed. If, for example, a strong wind blows laterally across the flue or vent stack which is coupled to the firebox, the pressure in the firebox may decline to an undesirably low level; that is, to a level resulting in a prohibitively high differential pressure across the diaphragm 15. This will result in a further upward movement of the blade 52 as viewed in FIG. 1, further diminishing motor speed to restore the draft pressure to a value within the preferred range. The operation of the control apparatus of the second embodiment, including the apparatus of FIGS. 5, 6, 8 differs from that of the first embodiment only with respect to the prior described operation of sections 122 and 57.

Figure 9:
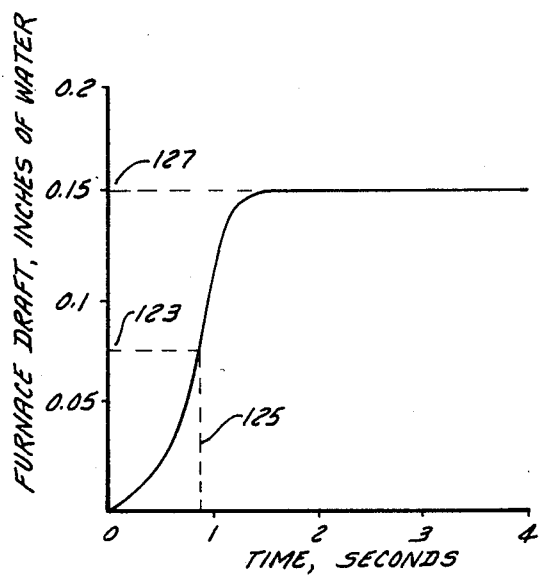
FIG. 9 is an operating curve generally depicting the manner of operation of the control apparatus.

The foregoing may be more easily understood by reference to the curve of FIG. 9 where the time of the closure of thermostat contact 99 is represented as time zero. Furnace draft will increase with increasing blower motor speed and upon reaching a predeterminable draft pressure, nominally 0.07–0.1 inches water as shown at point 123, the switch contacts 97 will be actuated at a time as generally represented by the line 125. At a greater differential pressure, the signal generating section 29 will commence modulation of the light beam until a steady state setpoint value 127 of differential pressure is achieved, nominally 0.15 inches water, and maintained as the normal operating differential pressure.

The following components have been found useful in the circuits of FIGS. 7 and 8 where capacitances are in microfarads and resistances are in ohms. The motor is preferably of the permanent split capacitor type.

| FIG. 7 | | | |
|---|---|---|---|
| C1 | 0.47, 400 V. | C2 | 100/25 V. |
| C3 | 10, 63 V. | C4 | 0.1, 250 V. |
| C5 | 0.1 | R1 | 47 |
| R2 | 150 | R3 | 0–100 |
| R4 | 2.2K | R5 | 15K, 2 W. |
| R6 | 33K | R7 | 100 |
| D1–D8 | IN5060 | D9 | OPB703 |
| T1 | 2N5232 | T2 | OPB703 |
| SW1 | MBS4991 | TR2 | Type SC140M |
| FIG. 8 | | | |
| C7 | 0.47, 400 V. | C8 | 100, 35 V. |
| C9 | 0.22, 100 V. | C10, C11 | 0.1, 400 V. |
| R9 | 47 | R10 | 43K |
| R11, R13 | 1K | R12 | 10K |
| R14 | 47K | T3 | 2N5232 |
| D11–D18 | IN5060 | R15 | 150 |
| SW2 | MBS4991 | TR4 | Type SC140M |
| R16 | 100 | | |

While only a few embodiments of the invention have been shown and described herein, it is not intended to be limited thereby but only by the scope of the claims which follow.

We claim:

1. A differential pressure control apparatus including:
 a switch responsive to a pneumatic differential pressure for signaling the actuation of a blower;
 a signal generating section for controlling the speed of said blower, said section including a source for projecting a continuous beam of light, first means for sensing said projected light beam and second means for modulating said light beam, said first means and said second means being positionably displaceable one to the other in response to the magnitude of said differential pressure;
 said second means including a blade devoid of a light-transmitting aperture therethrough and attached to and movable with a diaphragm in response to changes in said differential pressure, said signal generating section providing an analog output signal for controlling the speed of said blower.

2. The invention set forth in claim 1 wherein said second means is positionably displaceable with respect to said first means and for modulating the magnitude of luminous flux received at said first means.

3. Apparatus for controlling the draft of a furnace and including:
 a flexible diaphragm movable in response to a pneumatic differential pressure thereacross;
 a switch coacting with said diaphragm for signaling the actuation of a blower;
 a signal generating section coacting with said diaphragm for modulating a beam of light;
 said switch signaling said actuation when said differential pressure is in excess of a first predeterminable pressure, said generating section controlling said differential pressure when said differential pressure is within a range of pressures greater than said first pressure;
 said signal generating section including a single, continuously excited light source for projecting a light beam, a member for reflecting said light beam, a sensor for detecting said reflected beam and a blade attached to and movable with said diaphragm for modulating said light beam, said signal generating section thereby providing an analog electrical signal representative of the intensity of said light beam detected at said sensor.

4. A differential pressure control apparatus including:
 a flexible, generally planar diaphragm movable in response to a pneumatic differential pressure thereacross;
 a signal generating section coacting with said diaphragm for providing an analog output signal generally representative of said differential pressure;
 said generating section consisting of a single, continuously excited source of projected light, a sensor for detecting said light and means attached to said diaphragm for modulating the intensity of said light received by said sensor;
 said means including a substantially opaque member having an aperture formed therein, said aperture being substantially aligned with the projection axis of said light when said differential pressure is at or below a first pressure, said aperture being positionably displaced from said projection axis for light beam intensity modulation when said differential pressure is within a range of pressures in excess of said first pressure.

5. The invention set forth in claim 4 wherein said displacement of said aperture is generally proportional to the magnitude of said differential pressure within said range of pressures.

6. The invention set forth in claim 5 and further including means for adjustably selecting said first pressure.

7. A furnace draft control apparatus including:
   a housing;
   a movable diaphragm disposed in said housing and defining a first chamber for receiving air at ambient pressure and a second chamber for receiving air at a draft pressure;
   a switch disposed in said housing and adapted to be responsive to a first pressure differential between said ambient pressure and said draft pressure for signaling the actuation of a blower;
   a single, continuously excited source of projected light, a sensor for detecting said light, and a substantially opaque blade member movable with said diaphragm for modulating the intensity of said light received by said sensor thereby providing a sensor analog output signal;
   said blade member being attached to said diaphragm and protruding through said housing;
   a controller coupled to said sensor and including a low voltage section for operating a gas valve and a line voltage section for powering a furnace blower motor, said line voltage section having a rectifier circuit and a triac for controlling the RMS voltage applied to said motor.

8. The invention set forth in claim 7 wherein said light received by said sensor is reflected light and said blade member is devoid of aperture.

9. The invention set forth in claim 7 wherein said blade member includes an aperture.

* * * * *

UNITED STATES PATENT AND TRADEMARK OFFICE
CERTIFICATE OF CORRECTION

PATENT NO. : 4,626,681

DATED : December 2, 1986

INVENTOR(S) : Thomas E. Hayes; J. Scott Jamieson; Scott L. Spence

It is certified that error appears in the above-identified patent and that said Letters Patent are hereby corrected as shown below:

Column 8, Line 19, "means and for modulating" should be

--means for modulating--

Signed and Sealed this

Twenty-fourth Day of March, 1987

*Attest:*

DONALD J. QUIGG

*Attesting Officer*  *Commissioner of Patents and Trademarks*